United States Patent [19]

Kuhnell et al.

[11] 4,173,786
[45] Nov. 6, 1979

[54] METHOD AND APPARATUS FOR CUTTING A THREAD ON A ROTATING WORKPIECE

[75] Inventors: Thomas J. Kuhnell, Branch Hill; Randall C. Tanner, Lebanon; Alois V. Dryak, Glendale, all of Ohio

[73] Assignee: Cincinnati Milacron Inc., Cincinnati, Ohio

[21] Appl. No.: 809,280

[22] Filed: Jun. 23, 1977

[51] Int. Cl.² .................. G06F 15/46; G05B 19/24
[52] U.S. Cl. .................................... 364/475; 82/2 B; 318/571; 364/107; 409/69
[58] Field of Search .............. 364/107, 474, 475; 318/567, 569, 571, 579, 600; 82/1 C, 2 B, 5; 83/71, 72, 73; 408/3, 8-13; 90/11 A, 11 R, 13 R, 13 C, 13.5, 13.9, DIG. 1, 11.5, 11.52, 11.54, 11.56

[56] References Cited

U.S. PATENT DOCUMENTS

| | | | |
|---|---|---|---|
| 3,676,651 | 7/1972 | McDaniel | 18/569 X |
| 3,705,339 | 12/1972 | Rhoades et al. | 318/571 |
| 3,725,651 | 4/1973 | Cutler | 318/571 X |
| 3,854,353 | 12/1974 | Cutler | 318/567 X |
| 3,949,285 | 4/1976 | Rosshirt | 318/571 |
| 3,976,861 | 8/1976 | Edwards et al. | 318/571 X |
| 3,987,350 | 10/1976 | Pomella et al. | 318/571 |
| 4,017,723 | 4/1977 | Fickes | 318/569 X |

*Primary Examiner*—Joseph F. Ruggiero
*Attorney, Agent, or Firm*—C. Richard Eby

[57] ABSTRACT

A method and apparatus are disclosed for using a numerically controlled turning machine to automatically cut a thread in response to programmed data defining certain thread cutting parameters. The programmed data defines an initial thread cutting pass and the final thread depth. The method and apparatus cause the cutting tool to make a number of iterative thread cutting passes relative to the rotating workpiece with successive passes being made at correspondingly smaller cutting depths. The threading cycle is terminated by two finish passes at a predetermined minimum depth of cut.

10 Claims, 5 Drawing Figures

METHOD AND APPARATUS FOR CUTTING A THREAD ON A ROTATING WORKPIECE

BACKGROUND OF THE INVENTION

The invention relates generally to the field of numerically controlled turning machines; and specifically, the invention provides a numerically controlled turning machine for automatically cutting threads on a rotating workpiece in response to an input program defining the parameters of the thread cutting cycle.

Typically, on a thread cutting numerically controlled turning machine, a transducer is connected to the rotating spindle holding a workpiece; and a spindle signal is generated therefrom which represents the angular velocity of the spindle. The numerical control uses the spindle signal in conjunction with a programmed input signal defining the thread lead to generate command pulses to a servomechanism circuit for controlling the motion of the cutting tool relative to the rotating workpiece.

In cutting a thread, the numerical control causes a single point cutting tool to move iteratively through a number of thread cutting passes over the rotating workpiece. The depth of cut is accumulated with each pass; and when the final thread depth is achieved, the cycle of iterative motion is terminated. Once every revolution, an index or start pulse is generated from the spindle signal. With each cutting pass, the cutting tool is moved to a start point; and the index pulse is used to synchronize motion of the cutting tool relative to the rotating workpiece.

In earlier prior art systems, each threading pass had to be individually programmed which was a difficult and time consuming process producing excessive lengths of program tape. With the advent of computer numerical control the numerical controls have simplified much of the programming work. This is especially true for machining operations which are repetitive in nature.

For example, British Pat. No. 1,438,163 discloses an apparatus which responds to a tape program containing the final configuration of a part and generates a number of contouring cycles therefrom. The control contains a final configuration output unit, a contouring cycle instruction unit, an intermediate contouring position instruction unit and a judging and selection unit to determine the final size. A fixed general cycle of operation is built into the control. By means of the final configuration parameters and the constant depth of cut, the program places limits on the general cycle of operation. The control generates a number of iterative machining cycles until the final workpiece contour is achieved.

U.S. Pat. Nos. 3,854,353 and 4,017,723 disclose a method and apparatus for automatically generating iterative thread cutting cycles in response to programmed-information defining the thread cutting path parameters and the thread cutting depth. Given this information, the control generates a number of thread cutting passes at the programmed constant depth increment.

There are a number of disadvantages to the prior art devices which the present invention overcomes. First, in the prior art, successive passes are generated at a constant depth of cut. As is appreciated by those who are skilled in the art, the thread cutting tool for V-shaped thread is a relatively delicate triangular shaped tool. During the initial thread cutting passes, only a small amount of material is being removed; therefore, the depth of cut may be relatively large. However, with subsequent passes, greater amounts of material are being removed; and the depth of cut must be decreased to prevent tool breakage. The magnitude of the constant depth increment in the prior art devices must be compromised to the worst case situation. Therefore, during the initial passes, the cutting tool is not working to its potential, and inefficiency results.

Further, the programming of information in the prior art patents is somewhat burdensome. For example, U.S. Pat. No. 3,854,353 three blocks of information must be programmed to define a thread. With the present system, a single block of informatin is used in conjunction with parenthetical expressions defining the less variable thread parameters. Once the parenthetical expressions are programmed, they are used for all subsequent threads until they are specifically changed.

Further, with the device in U.S. Pat. No. 3,854,353, the thread start points are defined along a line from the start point $(X_0,Z_0)$ to the point $(X_1,Z_1)$ defined by the first block of tape. The relationship of these points must be calculated for each threading block. This line defined by the locus of thread start points forms an acute angle with the X machine axis. This angle is standard for many threads; and in the present invention the tangent of the angle is programmed as a constant in a parenthetical expression. Therefore, the start point need not be programmed along the line defined by the locus of thread start points.

SUMMARY OF THE INVENTION

According to one embodiment, a method and apparatus are claimed for cutting threads with a numerical control and turning machine system wherein the cutting tool moves along an X-axis perpendicular to the center line of the workpiece and along a Z-axis parallel to the center line of the workpiece in electrical synchronization with the rotation of the workpiece. The thread is cut in response to an input program by iteratively moving the cutting tool relative to the workpiece through a number of thread cutting cycles. A number of input signals are generated in response to the program which define the input initial depth increment, the total depth of the thread, the tangent of the angle between the X axis and the locus of thread start points, the final exit position of the initial pass, the thread lead and the first thread start point. The tool is caused to move from the start point to the first thread start point after which it is moved through a thread cutting pass back to the start point. The tool then moves through successive thread cutting passes wherein each successive pass has a correspondingly smaller depth increment. This process continues until the sum of the depth increments equals the programmed thread depth.

DESCRIPTION OF THE PREFERRED EMBODIMENT

Figure 1:
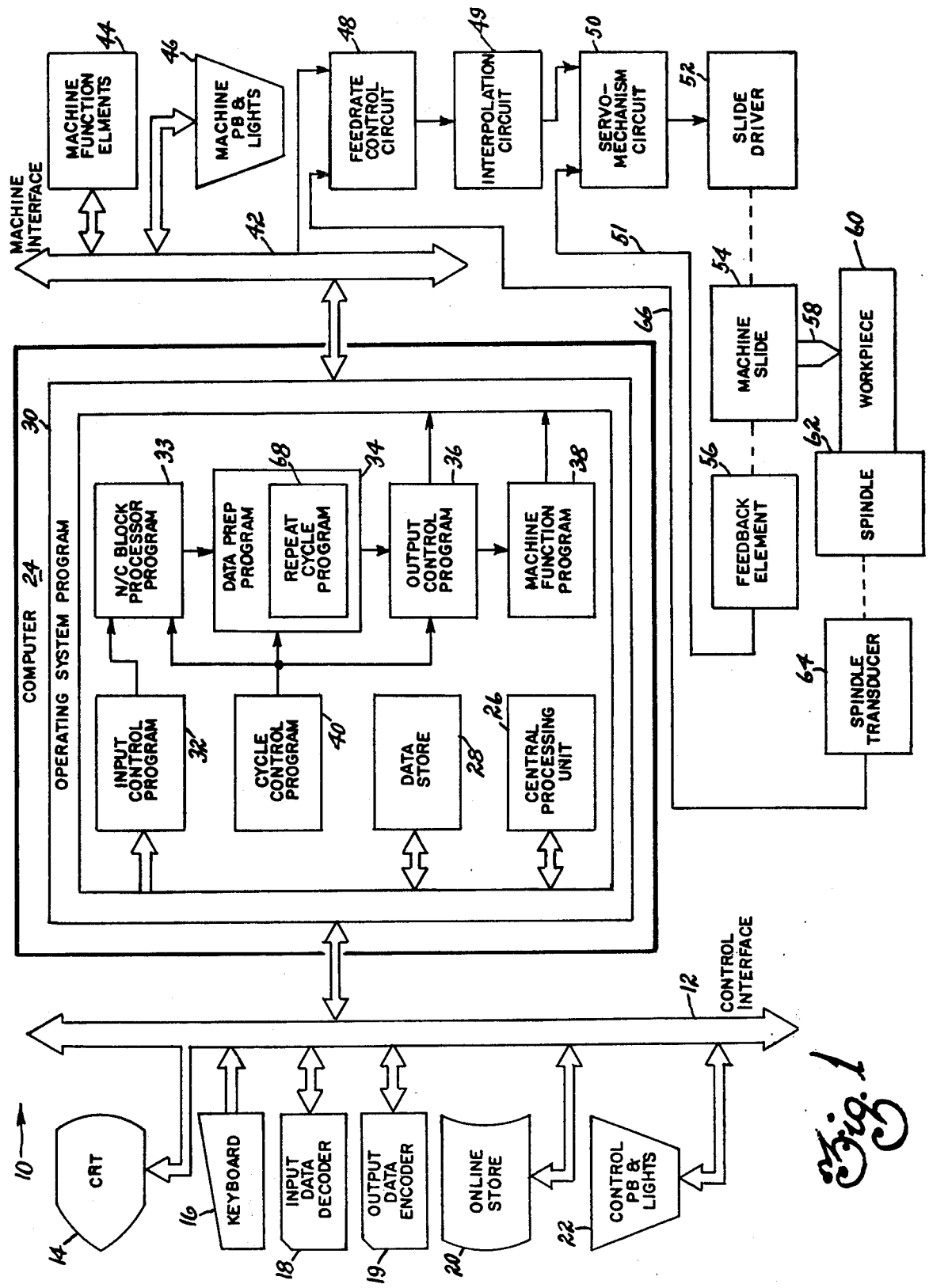
FIG. 1 is a general block diagram of a computer numerical control in which the disclosed thread cutting program may be implemented.

FIG. 1 is a general block diagram illustrating the basic components of a computer numerical control which are pertinent to the disclosed invention and in which the invention may be embodied. The elements as shown are those used in an ACRAMATIC computer numerical control manufactured by Cincinnati Milacron Inc. However, the exact definition and association of these elements may vary from one numerical control to another, and the disclosed invention may be implemented in any of the available computer numerical controls. Therefore, the exact details of the association of the elements shown in FIG. 1 should not be considered as limitations on the claimed method and apparatus.

The numerical control is shown generally at 10. Information is transferred into and out of the control by peripheral devices connected to a control interface 12. Such peripheral devices include a cathode ray tube 14, a keyboard 16, input decoder 18, output encoder 19, an on-line storage unit 20 and control push buttons and lights 22. The input information is processed by a computer 24 including a central processing unit 26, a data store 28 and a program store containing a number of specific programs.

The flow of information into and out of the computer as well as its overall operation is controlled by an operating system program 30. This program is generally a function of the computer used and is relatively independent of the application of the computer.

An input control program 32 controls the transfer of input information from a particular source connected to the control interface to a buffer data store in the computer. The input information is received by the NC block processor program 33 which reads the information from the buffer store performs error checks for syntax and executes the appropriate code conversions, e.g. BCD to binary, etc. A data preparation program 34 processes all axis motion information. This program calculates span length, feed rate information, controls the interpolation mode and controls optional features which influence axis motion, e.g. tool offsets, tool length compensation etc. After data preparation is complete, an output control program 36 receives all the processed information and separates the axis motion information from machine function control information. In addition to transferring the machine function control information to a machine function program 38, the output control program 36 controls the sequence of occurrence of machine functions relative to the axis motions. The cycle control program 40 controls the serial sequence of operations of the NC block processor program 33, data preparation program 34 and output control program 36.

Machine function control information is transferred under the control of the operating system program 30 to and from a machine interface 42. The machine interface distributes process information to and receives input information from the specific machine function elements 44 and machine push buttons and lights 46. At times determined by the operating system program 30, axis motion information is transferred by the output control program 36 through the machine interface 40 to feed rate control and interpolation circuits 48 and 49. The interpolation circuit 49 generates a command signal to the servomechanism circuit 50 which is also responsive to a feedback signal on line 51 and produces an error signal to a slide driver 52. The slide driver controls the operation of a machine slide 54 which is mechanically connected to a feedback element 56. The feedback element monitors the motion of the machine slide and generates the feedback signal on the line 51 as a function of said motion.

In the preferred embodiment, the invention is used in association with the thread cutting process executed on a turning machine. On this machine, a single point thread cutting tool 58 moves relative to a rotating workpiece 60 which is held in a spindle 62. A spindle transducer 64 is mechanically connected to the spindle 62 and produces signals back to the feed rate control circuit 48.

In a threading process, it is necessary to synchronize the motion of the cutting tool 58 along the Z-axis which is parallel to the center line of the workpiece 60 with the rotation of spindle 62. To accomplish this, the spindle transducer 64 generates a signal back to the feed rate control circuit 48 which creates two further signals. A first signal represents the angular velocity of the spindle, and a second signal is an index or gating pulse which is generated once every revolution of the spindle. A thread is cut by making a number of passes of the thread cutting tool over the workpiece 60. With each thread cutting pass, the tool is initially brought to the same position from which the next thread cutting pass is started. The index pulse is used to initiate the thread cutting pass, therefore, the thread cutting tool will initially contact the rotating workpiece at its same angular position with each thread cutting pass.

The elements described thus far are shown in the prior art and represent a starting point from which the present invention is made. To implement the present invention a repeat cycle program 68 is included within the data preparation program 34. The repeat cycle program is operative to generate a series of cycles of motions which automatically cut a finished thread in response to programmed thread parameters.

Figure 2:
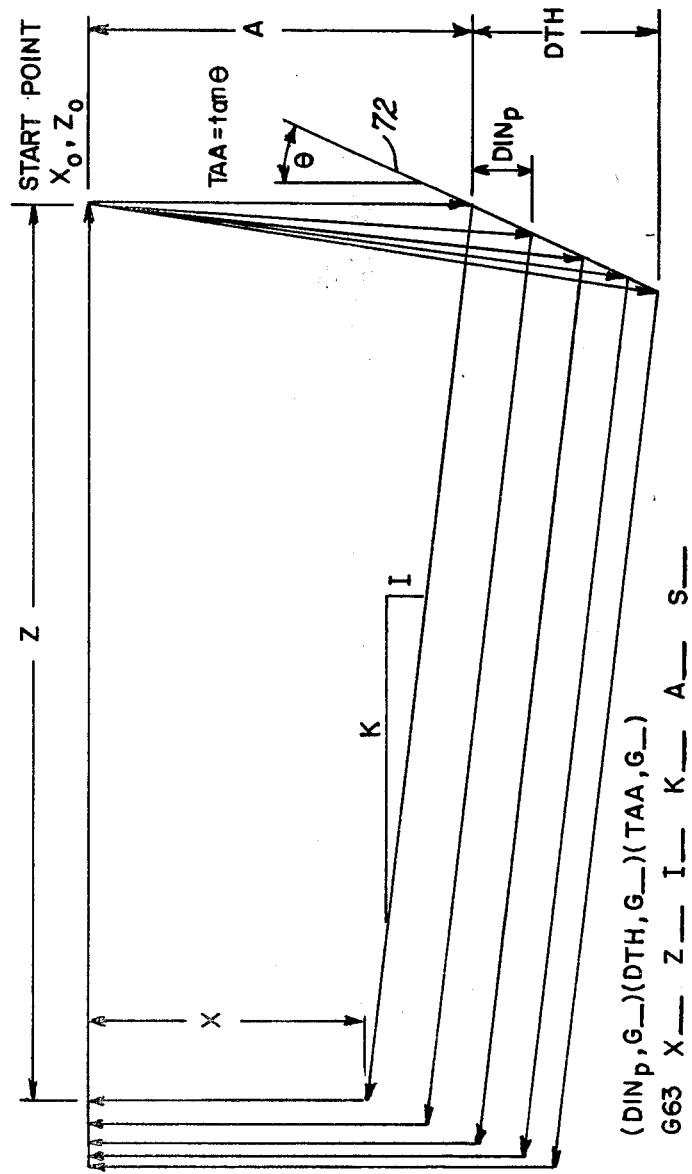
FIG. 2 is a schematic representation of tool displacements for a number of thread cutting passes which may be typically generated by the invention.

Referring to FIG. 2, a threading block of information requires a number of thread parameters to be programmed.

These parameters are programmed in two ways. First, the less variable parameters are progrmmed using parenthetical expressions. Once values for these expressions are input to the control, they are maintained and may be used for all subsequent threading cycles until they are specifically changed. The first parenthetical expression contains a $DIN_p$ value which defines the initial thread cutting depth increment. The second parenthetical expression contains a DTH value which is a signed number defining the total depth of the thread. The sign of the DTH value determines the direction of tool advance along the X-axis. The third parenthetical expression contains a TAA value defining the tangent of the angle of attack. This angle lies between the line 72 defined by the locus of thread start points and the X-axis which is perpendicular to the center line of the rotating workpiece.

After the parenthetical expressions have been programmed, a threading block of information may be programmed. This block of information begins with a preparation code, G63, defining a repeat cycle threading operation. Values associated with the X and Z addresses are programmed which define the final exit position of the cutting tool after the first thread cutting pass. The final exit position coincides with the start point ($X_0$, $Z_0$). Values associated with the I and K addresses are programmed which define the thread lead in the X and Z axes respectively. An A value is programmed which defines the displacement from the start point ($X_0$,$Z_0$) to the first thread start point. Finally, an S value defines the angular velocity of the spindle. As illustrated in FIG. 2, the threading program generates a number of iterative thread cutting passes of decreasing depth increments until the sum of the depth increments equals the programmed depth of thread.

Figure 3:
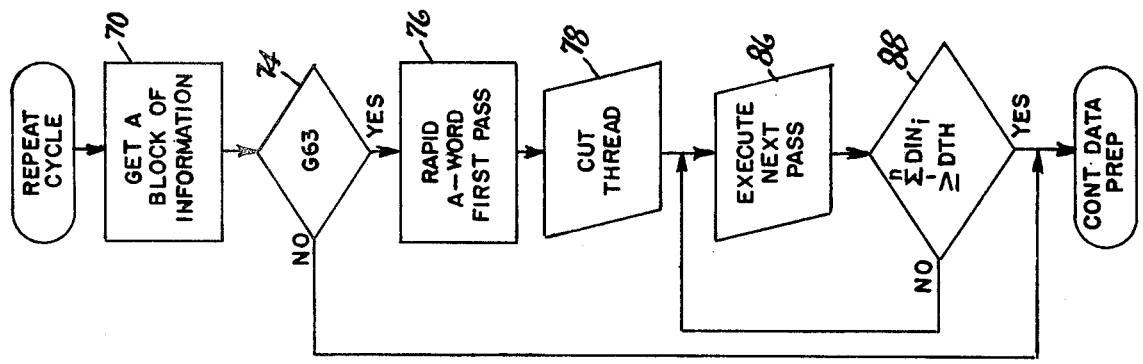
FIG. 3 is a flow chart illustrating the general method of the invention.

FIG. 3 is a flow chart illustrating the general method of the invention. Process block 70 retrieves a block of information from a buffer store. Decision block 74 determines whether or not a thread preparation code is present. If it is not, the process continues in the normal data preparation cycle. If the code is present, process block 76 causes the tool to rapid from the start point through a displacement defined by the A word to the first threading start point. The subroutine defined in block 78 causes the tool to execute a first thread cutting pass and return to the start point.

Figures 4, 5:
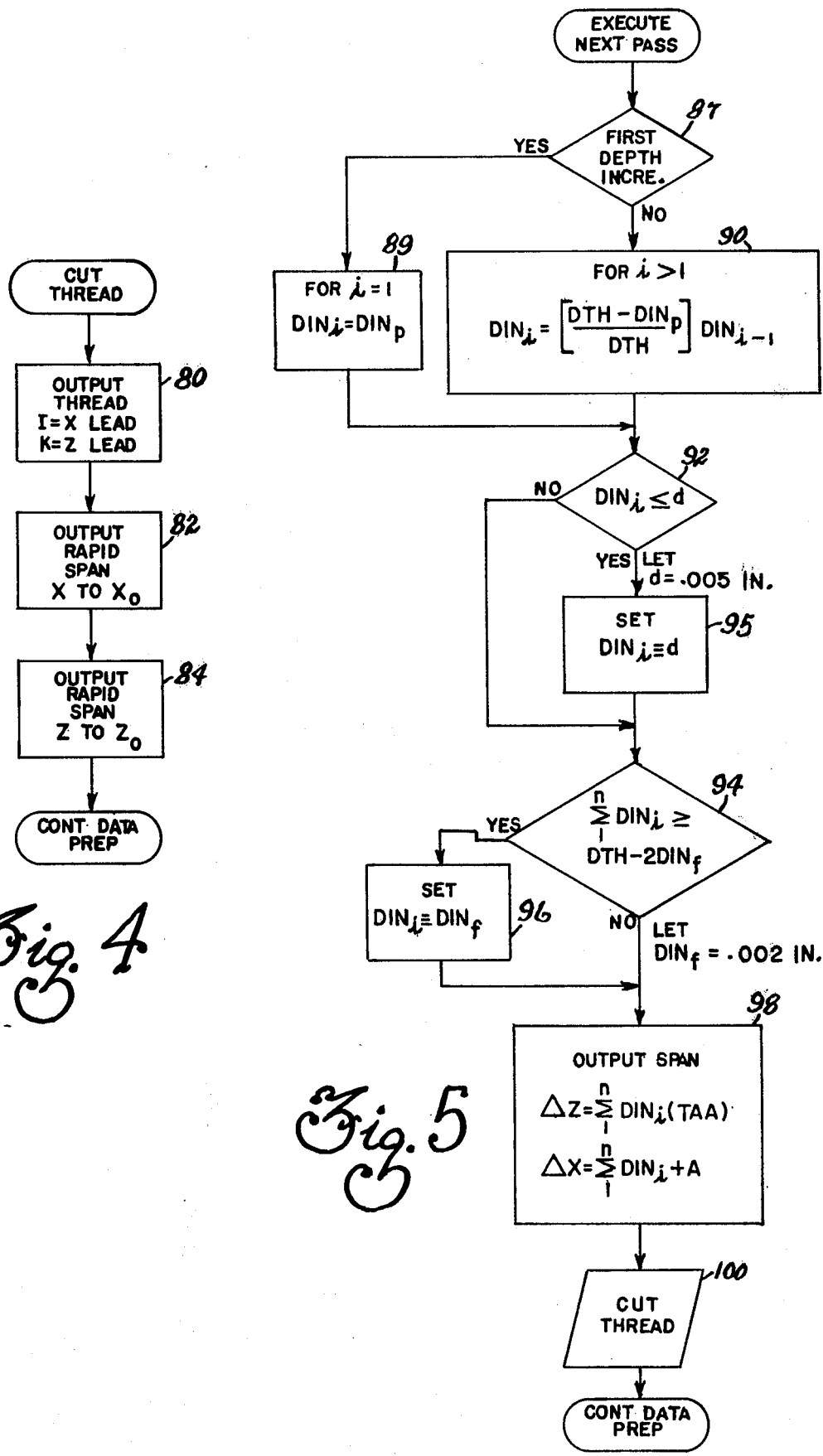
FIG. 4 is a detailed flow chart of a routine for executing a single thread cutting pass.
FIG. 5 is a detailed flow chart of a routine for calculating subsequent depth increments and executing thread cutting passes as a function thereof.

FIG. 4 is a detailed flow chart illustrating the steps of this process. It should be noted that this process is well-known in the prior art. First, process block 80 responds to the programmed lead values and the feedback signal from the spindle transducer 64 and causes the feedrate control circuits to generate a pulse train to the servo-mechanism circuit for moving the tool at a linear velocity corresponding to the programmed lead and angular spindle velocity. Assume for purposes of illustration that a thread is being cut along the Z-axis as illustrated in FIG. 2. The tool will move at the appropriate velocity through a displacement defined by the Z-value. At the end of this motion, process block 82 causes the tool to move along the X-axis through a displacement corresponding to the programmed X value. Thereafter, process block 84 causes the tool to move along the Z-axis through a displacement corresponding to the programmed Z-value, thereby returning cutting tool to the start point. At this point, one complete thread cutting pass has been executed.

As will be appreciated by those who are skilled in the art, at the end of the process defined by block 80 the cutting tool can be made to withdraw from the thread at a 45° angle. This angular withdrawal is standard in the prior art and may be implemented with the disclosed invention.

Returning to FIG. 3, after the first thread cutting pass has been executed, subroutine block 86 controls the execution of the next thread cutting pass. Next, decision block 88 determines whether or not the sum of the depth increments is equal to the programmed thread depth. If it is not, the subroutine in block 86 is again executed. When the sum of the depth increments equals the program depth, the thread is complete; and the process moves to other machine operations.

There are many functions being controlled by the data preparation program, the repeat cycle program being only one thereof. Further, many iterations through the data preparation program will be required for a complete execution of the repeat cycle program. Therefore, the flow chart of FIG. 2 does not represent a deviation from the data preparation program but is integrated within the standard operation of said program.

FIG. 5 is a detailed flow chart of the steps required to execute the subroutine block 86 shown in FIG. 3. First, decision block 87 determines whether the next thread cutting path represents the first depth increment. Process block 89 sets the first depth increment equal to the programmed depth increment—$DIN_p$. On subsequent thread cutting passes, process block 90 determines the corresponding depth increment. As the equation in block 90 indicates, each successive depth increment is smaller that the preceeding depth increment. As will be appreciated, there is a minimum limit to which the depth increment should be allowed to progress. In other words, for a fully loaded tool, there is an optimum depth increment—d—below which the cutting process becomes inefficient. In the preferred embodiment, d is equal to 0.005 inches. Decision block 92 determines whether the calculated depth increment is less than or equal to the optimum depth increment. If the calculated depth increment is less than or equal to 0.005 inches, process block 95 sets the depth increment equal to 0.005 inches. If the calculated depth increment is not less than or equal to 0.005 inches, the calculated value is used as the actual depth increment.

In the preferred embodiment, a thread is cut by making a first number of rough thread cutting passes and then finishing the thread by making two finish thread cutting passes. The finish thread cutting passes are ideally made at a fixed predetermined depth of cut. Decision block 94 detects when it is necessary to begin the finish thread cutting passes. Under ideal conditions, the finish thread cutting passes should be made at a predetermined final depth increment—$DIN_f$. A typical value for the final depth increments is 0.002 inches. Therefore decision block 94 detects when the sum of the depth increments equals or exceeds the programmed depth minus twice the predetermined minimum depth increment, i.e. 0.004 inches. If the sum of the depth increments is equal to or less than the programmed depth minus twice the final depth increment, process block 96 sets the current depth increment equal to the final depth increment—0.002 inches. This step guarantees that the final passes will be taken at the predetermined final depth increment.

After the depth increment has been determined, process block 98 outputs displacement information to cause the tool to rapid to a thread start point. The tool is caused to move along the Z-axis through a displacement equal to the product of the sum of the depth increments times the tangent of the angle of attack. The tool is caused to move through a displacement along the X-axis equal to the sum of the depth increments plus the A value. Subroutine 100 takes control of the tool at the thread start point, executes a thread cutting pass, and returns the tool to the start point. The steps of this subroutine are illustrated in FIG. 4. The process continues through the subroutine defined by FIG. 5 and the decision block 99 defined in FIG. 3 until the sum of the depth increments equals the programmed depth.

While the invention has been illustrated in some detail according the preferred embodiments shown in the accompanying drawings and while the preferred illustrated embodiments have been described in some detail, there is no intention to thus limit the invention to such detail. On the contrary, it is intended to cover all modifications alterations, and equivalents falling within the spirit and scope of the appended claims.

What is claimed is:

1. An apparatus for cutting threads with a numerical control and turning machine system wherein a cutting tool moves from a start point, along an X-axis perpendicular to the center line of a workpiece and along a Z-axis parallel to the center line of the workpiece in synchronization with the rotation of the workpiece, said thread being cut in response to an input program by iteratively moving the cutting tool relative to the workpiece through a number of thread cutting cycles, the apparatus comprising:
   (a) means resonsive to the input program for generating input signals including
       (1) a $DIN_p$ signal representing an initial depth increment,
       (2) a DTH signal representing a signed number defining the total depth of the thread,
       (3) a TAA signal representing the tangent of the attack angle between the X-axis and a locus of points defined by thread start points,
       (4) position signals defining the final exit position of the cutting tool after a first thread cutting pass, said final exit position being coincident with the start point,
       (5) lead and angular spindle velocity signals defining the linear velocity of the cutting tool along the X and Z-axes, and
       (6) a rapid signal defining a displacement along the X-axis to a first thread start point for the first thread cutting pass;
   (b) means responsive to the rapid, lead, angular spindle velocity, and position signals for generating first command signals to cause the cutting tool to move from the start point, through the first thread cutting pass and back to the start point, said first thread cutting pass having a depth of cut equal to the rapid value;
   (c) means responsive to the TAA, $DIN_p$, rapid, lead, angular spindle velocity, and position signals for providing second command signals to cause the cutting tool to move from the start point, through a second thread cutting pass and back to the start point, said second thread cutting pass having a depth of cut equal to the sum of the rapid and the $DIN_p$ signals;
   (d) means responsive to the TAA, $DIN_p$, DTH, rapid, lead, angular spindle velocity, and position signals for producing sets of subsequent command signals to cause the cutting tool to move from the start point through subsequent thread cutting passes, and back to the start point, said subsequent thread cutting passes having corresponding depths of cut increasing by successively smaller increments, and
   (e) means responsive to the DTH signal for terminating the thread cutting cycle when the depth of cut equals or exceeds the magnitude of the DTH signal.

2. The apparatus of claim 1 wherein the apparatus further comprises:
   (a) means responsive to the producing means and the DTH signal for detecting a predetermined uncut increment of thread depth; and
   (b) means responsive to the detecting means for setting the depth increment of the remaining thread cutting passes equal to a predetermined magnitude.

3. The apparatus of claim 1 wherein the apparatus further comprises:
   (a) means for sensing when the depth of cut equals or exceeds the total depth of the thread minus a predetermined magnitude defined by a multiple of a predetermined final depth increment; and
   (b) means responsive to the sensing means for setting the depth of cut of the remaining thread cutting passes in accordance with the predetermined final depth increment.

4. The apparatus of claim 1 wherein the producing means further comprises:
   (a) means responsive to the DTH signal and the $DIN_p$ signal for providing a depth increment signal for each of the subsequent thread cutting passes, each successive thread cutting pass having a successively smaller depth increment;
   (b) means responsive to the depth increment signals, the TAA signal and the rapid signal for producing first signals in a set of command signals to cause the cutting tool to move during each thread cutting pass from the start point to a new thread start point defined by
       (1) an incremental displacement along the Z-axis equal to the product of the tangent of the attack angle times the sum of the depth increments, and
       (2) an incremental displacement along the X-axis equal to the sum of the displacement to the first thread start point plus the sum of the depth increments; and
   (c) means responsive to the lead, angular spindle velocity, and position signals for generating second signals in a set of command signals to cause the tool to move from each of the new thread start points, through a thread cutting pass and back to the start point.

5. The apparatus of claim 4 wherein the the depth increment signal for each of the subsequent thread cutting passes is provided in accordance with the following expression:

$$DIN_i = [(DTH - DIN_p)/DTH]DIN_{i-1}$$

6. A method for cutting threads with a numerically controlled turning machine wherein the cutting tool moves from a start point, along an X-axis perpendicular to the center line of a rotating workpiece and along a Z-axis parallel to the center line of a rotating workpiece in synchronization with the rotation of the workpiece, said thread being cut in response to an input program by iteratively moving the cutting tool relative to the workpiece through a number of thread cutting cycles, the method comprising the steps of:
   (a) generating, in response to the input program, input signals representing a number of thread cutting parameters including
       (1) a $DIN_p$ value representing a first depth increment,
       (2) a DTH value representing the total thread depth,
       (3) a TAA value representing the tangent of the attack angle between the X-axis and a locus of points defined by the thread start points,
       (4) position values defining the final exit position of the cutting tool after a first thread cutting pass, said final exit position being coincident with the start point,
       (5) lead and angular spindle velocity values defining the linear velocity of the cutting tool along the X and Z-axes, and (6) a rapid value defining a displacement along the X-axis to a first thread start point of the first thread cutting pass;

(b) moving the cutting tool along the X-axis from the start point to the first thread start point in response to the rapid value;

(c) moving the cutting tool through a thread cutting pass and back to the start point in response to the position, lead, and angular spindle velocity values;

(d) moving the cutting tool from the start point through a first displacement to a second thread start point, said first displacement having
   (1) an X-axis component equal to the rapid value plus a first depth increment equal to the $DIN_p$ value, and
   (2) a Z-axis component equal to the product of the TAA value times the $DIN_p$ value;

(e) iterating step (c);

(f) moving the cutting tool from the start point through a second displacement to a subsequent thread start point, said second displacement having
   (1) an X-axis component equal to the sum of the rapid value plus a current depth increment plus the sum of the previous depth increments, said current depth increment being less than the immediately previous depth increment, and
   (2) a Z-axis component equal to the product of the TAA value times the sum of the previous depth increments plus the current depth increment;

(g) iterating step (c); and (h) iterating steps (f) and (g) to move the cutting tool through iterative thread cutting passes having decreasing depth increments until the sum of the depth increments equals or exceeds the DTH value.

7. The method of claim 6 wherein the method of step (f) further comprises the steps of: p1 (a) detecting when the sum of the depth increments equals the DTH value minus a predetermined magnitude; and
   (b) setting the final depth increments for the final thread cutting passes as a function of the predetermined magnitude.

8. The method of claim 6 wherein, the method of step (f) further comprises the steps of:
   (a) detecting when the sum of the depth increments equals or exceeds the DTH value minus twice a predetermined final depth increment value; and
   (b) setting each of the subsequent depth increments equal to the final depth increment value.

9. The method of claim 6 wherein the method of step (f) further comprises the step of:
   providing the current depth increment in accordance with the following expression:

$$DIN_i = [(DTH - DIN_p)/DTH]DIN_{i-1}$$

10. The method of claim 6 wherein after calculating a new depth increment, the method comprises the steps of:
   (a) comparing each new depth increment to a predetermined optimum depth increment; and
   (b) setting the new depth increment equal to the predetermined optimum depth increment in response to the new depth increment being equal to or less than the predetermined optimum depth increment.

* * * * *